United States Patent Office.

JOHN MAY JAMESON, OF WIGSTON FIELDS, ENGLAND.

PROCESS OF MAKING FUEL FROM FLOOR-DUST, HOUSE REFUSE, &c.

SPECIFICATION forming part of Letters Patent No. 663,441, dated December 11, 1900.

Application filed May 28, 1900. Serial No. 18,349. (No specimens.)

*To all whom it may concern:*

Be it known that I, JOHN MAY JAMESON, civil engineer, a subject of Her Britannic Majesty Queen Victoria, residing at Lorraine Villa, Wigston Fields, in the county of Leicester, England, have invented a certain new and useful process of treating floor-dust and house and other refuse for making or converting it into fuel for burning either in open fire-grates or inclosed furnaces or the like as a substitute for coal by mixing the dust or refuse during or after grinding it along with a disinfectant in the form of charcoal and oil or the like caloric bituminous and inflammable substance or substances, of which the following is a specification.

The mode of practicing my invention is as follows: I take any floor-dust and house or other refuse that is capable of being consumed (after the consumable has been sorted from the non-consumable) and proceed to place it in a grinding-mill of any well-known kind—such as, for instance, a "mortar-mill"—such consumable refuse including rags, paper, cinders, coke, ashes, and the like matter usually found in the refuse from dust-bins, ash-pits, dust-boxes, and the like. The whole of this is taken and put into the mill and the atoms thereof pulverized or ground into a powder without resorting, and sufficient quantity of charcoal is introduced so as to destroy the smell and act as a disinfectant. During the grinding operation oil of any kind, quality, or strength is mixed therewith until the mass assumes the proper consistency or shall be of the consistency of paste. When the mass has been properly mixed and worked well, it is put into molds to form briquets or other analogous shapes. Briquet-machines may also be brought into use, if desired. The molds, after being slightly pressed in a brick-press or other well-known machine, are carried to the drying-ground and are air or kiln dried, when they are ready for use. Those intended for house use in open fire-grates are made to contain more inflammable material or unctous fluid expressed or drawn from natural, animal, or vegetable substances than those required for slow-combustion fuel in closed furnaces. The non-consumable material, consisting of broken glass, pottery, crockery, and scrap, goes to make foundations for road and bank or path making. The other, consisting of garbage, bones, and the like, is collected and passed down a chute into a metal tank of the required dimensions or capacity and after leveling it is covered well over with dust from the sorting-sieves or ashes from the converter-furnace and hermetically sealed, so that there is no possibility of smell escaping therefrom, besides reducing the garbage to a proper strength for distribution on either arable or pasture land as manure after having been ground in the mill. The old-leather waste found in such refuse can be utilized and made into leather-board and scrap iron or tin put into a crucible or blast-furnace to produce an amalgam.

In practice I find that the following quantities will produce most satisfactory results, the block fuel from which will burn thoroughly, whether said blocks are used wholly or broken in pieces, and which will be produced at a small cost. My desire is more particularly to obviate house or town refuse being consumed by the expensive method now in use by most corporations of employing and building "destructors" and entirely do away with the distribution of pestilential vapors now so freely emitted from such appliances. I take, for example, according to quality, one ton of refuse that is ready for grinding, twelve pounds, or thereabout, (by weight,) of charcoal, and six gallons, approximately, (by measure,) of oil, more or less, according to the material under treatment, especially with the refuse from oil-mills.

I am fully aware that refuse collected from dust-bins, ash-pits, dust-boxes, and the like has been treated both by peat, charcoal, and minerals; also, that dust collected from the streets and mixed with linseed-oil and other ingredients has been made, besides many others; but I make no claim, broadly, to any of these, for by the process herein described I have produced a cheap and successful fuel from matter which has now to be thrown to the pestilential destructor so commonly employed in large cities.

Having now particularly described the nature of my said invention, what I desire to secure by Letters Patent and claim is—

The within-described process of treating or converting the consumable matter from floor-dust, and house refuse into fuel by grinding it along with charcoal and mixing therewith oil so that the whole mass assumes the consistency of paste in a condition for molding and drying, substantially as described.

In witness whereof I have hereunto set my hand this 12th day of April, 1900.

JOHN MAY JAMESON.

Witnesses:
 FRED FELLOWS WIGGINS,
 GEORGE WILLIAM COLTMAN.